US007917676B2

(12) United States Patent
Sullivan, Jr. et al.

(10) Patent No.: US 7,917,676 B2
(45) Date of Patent: *Mar. 29, 2011

(54) EFFICIENT EXECUTION OF MEMORY BARRIER BUS COMMANDS WITH ORDER CONSTRAINED MEMORY ACCESSES

(75) Inventors: James Edward Sullivan, Jr., Cary, NC (US); Jaya Prakash Subramaniam Ganasan, Youngsville, NC (US); Richard Gerard Hofmann, Cary, NC (US)

(73) Assignee: QUALCOMM, Incorporated, San Diego, CA (US)

( * ) Notice: Subject to any disclaimer, the term of this patent is extended or adjusted under 35 U.S.C. 154(b) by 542 days.

This patent is subject to a terminal disclaimer.

(21) Appl. No.: 11/397,287

(22) Filed: Apr. 4, 2006

(65) Prior Publication Data

US 2007/0214298 A1 Sep. 13, 2007

Related U.S. Application Data

(60) Provisional application No. 60/781,091, filed on Mar. 10, 2006.

(51) Int. Cl.
*G06F 13/00* (2006.01)
(52) U.S. Cl. ........ 710/110; 710/107; 710/306; 710/315; 711/154; 711/152; 711/168; 712/225; 712/216
(58) Field of Classification Search .................. 711/154, 711/152, 168; 710/110, 107, 306, 315; 712/225, 712/216
See application file for complete search history.

(56) References Cited

U.S. PATENT DOCUMENTS

| 5,664,124 | A | | 9/1997 | Katz et al. |
| 5,884,027 | A | | 3/1999 | Garbus et al. |
| 5,893,151 | A | | 4/1999 | Merchant |
| 5,893,165 | A | * | 4/1999 | Ebrahim ..................... 711/158 |
| 6,038,646 | A | | 3/2000 | Sproull |
| 6,047,334 | A | | 4/2000 | Langendorf et al. |
| 6,073,210 | A | | 6/2000 | Palanca et al. |
| 6,088,771 | A | | 7/2000 | Steely, Jr. |
| 6,247,102 | B1 | | 6/2001 | Chin et al. |

(Continued)

FOREIGN PATENT DOCUMENTS

JP 04190435 7/1992

(Continued)

OTHER PUBLICATIONS

International Search Report-PCT/US07/063510, International Search Authority-European Patent Office-Jan. 23, 2008.

(Continued)

*Primary Examiner* — Hong Kim
(74) *Attorney, Agent, or Firm* — Peter M. Kamarchik; Nicholas J. Pauley; Jonathan T. Velasco

(57) ABSTRACT

The disclosure is directed to a weakly-ordered processing system and method of executing memory barriers in weakly-ordered processing system. The processing system includes memory and a master device configured to issue memory access requests, including memory barriers, to the memory. The processing system also includes a slave device configured to provide the master device access to the memory, the slave device being further configured to produce a signal indicating that an ordering constraint imposed by a memory barrier issued by the master device will be enforced, the signal being produced before the execution of all memory access requests issued by the master device to the memory before the memory barrier.

22 Claims, 3 Drawing Sheets

U.S. PATENT DOCUMENTS

| | | |
|---|---|---|
| 6,275,913 B1 | 8/2001 | Jeddeloh |
| 6,370,632 B1 | 4/2002 | Kikuta et al. |
| 6,385,705 B1 | 5/2002 | Keller et al. |
| 6,609,192 B1 | 8/2003 | Guthrie et al. |
| 6,708,269 B1 | 3/2004 | Tiruvallur et al. |
| 6,708,629 B2 | 3/2004 | Dumouchel |
| 6,963,967 B1 * | 11/2005 | Guthrie et al. ............. 712/225 |
| 6,976,115 B2 | 12/2005 | Creta et al. |
| 7,353,313 B2 | 4/2008 | Wehage et al. |
| 7,398,376 B2 | 7/2008 | McKenney |
| 7,454,570 B2 | 11/2008 | Dunshea et al. |
| 2002/0194436 A1 * | 12/2002 | McKenney ................ 711/152 |
| 2003/0131175 A1 | 7/2003 | Heynemann et al. |
| 2005/0273583 A1 * | 12/2005 | Caprioli et al. ............. 712/245 |
| 2006/0026309 A1 * | 2/2006 | Day et al. .................... 710/22 |
| 2006/0031621 A1 | 2/2006 | Riley et al. |
| 2006/0031844 A1 * | 2/2006 | Dice et al. ................. 718/106 |
| 2006/0179429 A1 * | 8/2006 | Eggers et al. ............. 717/151 |
| 2006/0218335 A1 * | 9/2006 | Hofmann et al. ............. 710/316 |
| 2006/0218358 A1 | 9/2006 | Hofmann et al. |
| 2008/0059683 A1 | 3/2008 | Sullivan et al. |

FOREIGN PATENT DOCUMENTS

| | | |
|---|---|---|
| JP | 2009-269935 | 10/1997 |
| RU | 2140667 | 10/1999 |
| RU | 2157000 | 9/2000 |
| WO | WO96/17303 | 6/1996 |
| WO | WO97/00480 | 1/1997 |
| WO | 2005121948 | 12/2005 |
| WO | 2006102636 | 9/2006 |

OTHER PUBLICATIONS

Written Opinion-PCT/US07/063510, International Search Authority-European Patent Office-Jan. 23, 2008.

* cited by examiner

EFFICIENT EXECUTION OF MEMORY BARRIER BUS COMMANDS WITH ORDER CONSTRAINED MEMORY ACCESSES

The present Application for Patent claims priority to Provisional Application No. 60/781,091 entitled "Efficient Execution of Memory Barrier Bus Commands" filed Mar. 10, 2006, and assigned to the assignee hereof and hereby expressly incorporated by reference herein.

FIELD

The present disclosure relates generally to processing systems, and more particularly, to techniques for efficiently handling memory barrier bus commands in a processing system.

BACKGROUND

Computers and other modern processing systems have revolutionized the electronics industry by enabling sophisticated tasks to be performed with a few strokes of a keypad. These sophisticated tasks often involve a number of devices that communicate with one another in a fast and efficient manner using a bus. The bus provides a shared communication link between devices in a processing system.

The types of devices connected to a bus in a processing system may vary depending on the particular application. Commonly, the bus is configured to support a number of processors, memory devices, and peripherals. In these systems, the processors often achieve performance benefits by allowing memory operations to be performed out-of-order. For example, a processing system may achieve performance benefits by reordering a sequence of memory operations to allow all operations to the same page in memory to be executed before a new page is opened. Processing systems that are allowed to reorder memory operations are generally referred to as "weakly-ordered" processing systems.

In certain instances, the reordering of memory operations may unpredictably affect program behavior. For instance, an application may require a processor to write data to memory before the processor reads from memory. In a weakly-ordered processing system, there is no guarantee that this will occur. This result may be unacceptable.

Various techniques have been employed for executing ordered memory operations in a weakly-ordered processing system. One technique is simply to delay certain memory operations until all memory operations before it are executed. In the previous example, the processor may delay issuing a read request until it receives an indication that guarantees that the data has been written to the memory.

A common technique in modern day processor architectures is to use a bus command known as a "memory barrier" when an ordered memory operation is required. A "memory barrier" may be used to ensure that all memory access requests issued by a processor before the memory barrier are executed before all memory access requests issued by the processor after the memory barrier. Again, in the previous example, a memory barrier could be sent to the memory by the processor before issuing a read request. This would ensure that the processor writes to memory before it reads from the memory.

Memory barriers are an effective way to impose ordering constraints on memory operations in weakly-ordered processing systems, but are inefficient from a system performance perspective. The memory barrier may be particularly inefficient in processing systems with multiple memory devices. In these processing systems, a memory barrier would need to be issued by the processor to every memory device it can access to enforce an ordering constraint on memory operations. As a result, the next memory operation following a memory barrier is delayed until each memory device accessible by the processor completes all outstanding memory operations. Thus, there is a continuing need for more efficient methods to perform memory barrier operations in a weakly-ordered processing system.

SUMMARY

One aspect of a weakly-ordered processing system is disclosed. The processing system includes memory and a master device configured to issue memory access requests, including memory barriers, to the memory. The processing system also includes a slave device configured to provide the master device access to the memory, the slave device being further configured to produce a signal indicating that an ordering constraint imposed by a memory barrier issued by the master device will be enforced, the signal being produced before the execution of all memory access requests issued by the master device to the memory before the memory barrier.

Another aspect of a weakly-ordered processing system is disclosed. The processing system includes memory and a master device configured to issue memory access requests, including memory barriers, to the memory. The processing system also includes a slave device configured to provide the master device access to the memory, the slave device being further configured to acknowledge a memory barrier issued by the master device, the memory barrier being acknowledged before the execution of all memory access requests issued by the master device to the memory before the memory barrier.

A method of executing memory barriers in weakly-ordered processing system is disclosed. The processing system includes a master device, a slave device, and memory. The method includes issuing a memory barrier from the master device to the memory, and producing, at the slave device, a signal indicating that an ordering constraint imposed by the memory barrier will be enforced, the signal being produced before the execution of all memory access requests to the memory issued by the master device before the memory barrier.

It is understood that other embodiments of the present disclosure will become readily apparent to those skilled in the art from the following detailed description, wherein it is shown and described only various embodiments of the disclosure by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of the present disclosure are illustrated by way of example, and not by way of limitation, in the accompanying drawings, wherein.

DETAILED DESCRIPTION

The detailed description set forth below in connection with the appended drawings is intended as a description of various embodiments of the disclosure and is not intended to represent the only embodiments in which the disclosure may be practiced. The detailed description includes specific details for the purpose of providing a thorough understanding of the disclosure. However, it will be apparent to those skilled in the art that the disclosure may be practiced without these specific details. In some instances, well known structures and components are shown in block diagram form in order to avoid obscuring the concepts of the disclosure.

Figure 1:
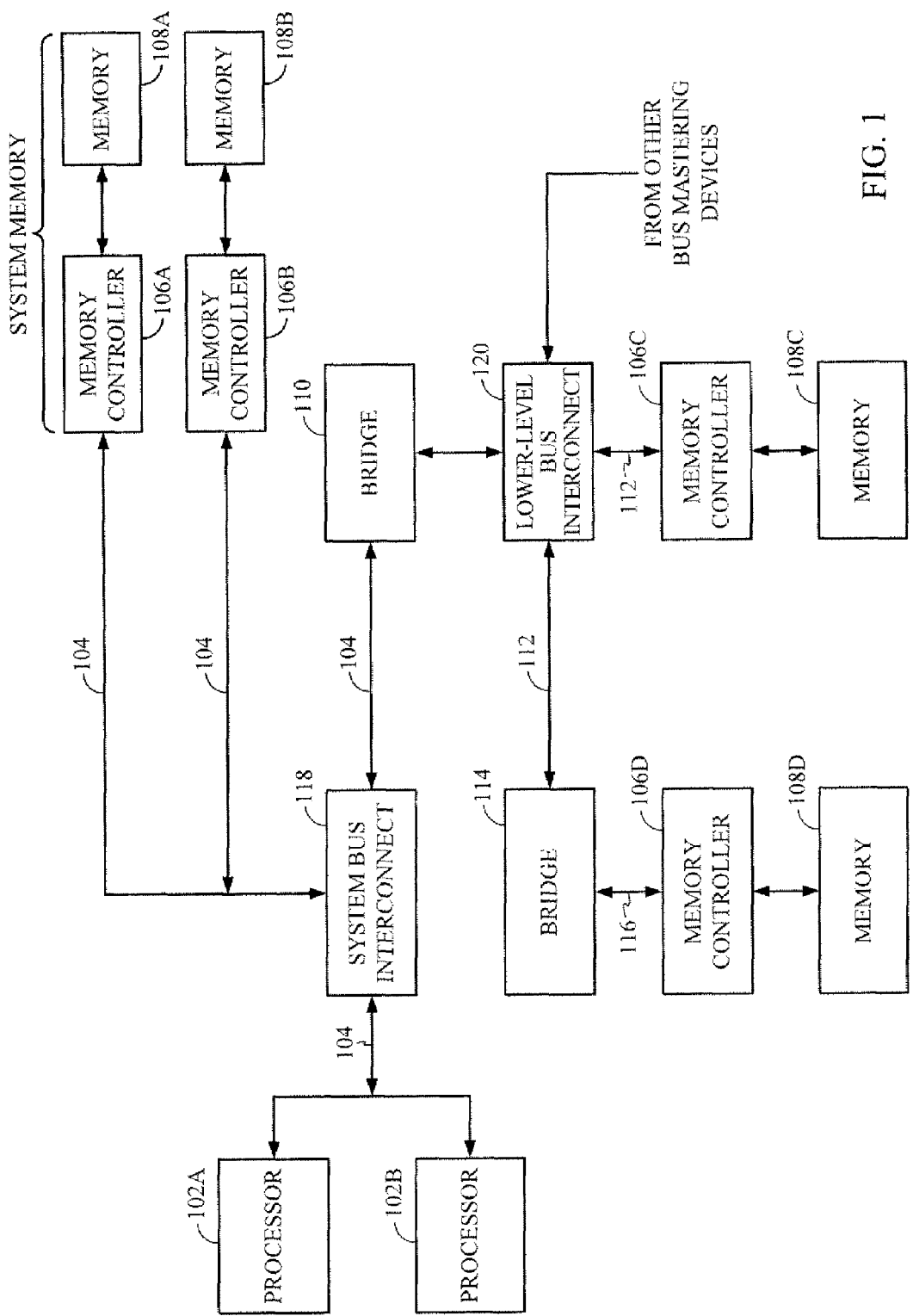
FIG. 1 is a conceptual block diagram illustrating an example of a weakly-ordered processing system.

FIG. 1 is a conceptual block diagram illustrating an example of a weakly-ordered processing system. The processing system 100 may be a computer, resident in a computer, or any other system capable of processing, retrieving and storing information. The processing system 100 may be a stand-alone system, or alternatively, embedded in a device, such as a wireless or wired telephone, a personal digital assistant (PDA), a desktop computer, a laptop computer, a game console, a pager, a modem, a camera, automotive equipment, industrial equipment, video equipment, audio equipment, or any other suitable device requiring processing capability. The processing system 100 may be implemented as integrated circuit, part of an integrated circuit, or distributed across multiple integrated circuits. Alternatively, the processing system 100 may be implemented with discrete components, or any combination of discrete and integrated circuitry. Those skilled in the art will recognize how best to implement the processing system 100 for each particular application.

The processing system 100 is shown with a bus architecture that connects multiple master devices to multiple slave devices. A "master device" is any device that can issue a bus request, and a "slave device" is any device that responds to a bus request. In the processing system 100 shown in FIG. 1, the master devices comprise two processors 102a, 102b. Each processor 102a, 102b may be any type of processing entity including, by way of example, a microprocessor, a digital signal processor (DSP), an application specific integrated circuit (ASIC), a field programmable gate array (FPGA) or other programmable logic, discrete gate or transistor logic, or discrete hardware components.

The processors 102a, 102b are connected to multiple slave devices by a high speed bus, commonly referred to as a system bus 104. The slave devices include two memory controllers 106a, 106b, each providing access to an independent memory 108a, 108b, respectively. In this embodiment of the processing system, each memory 108a, 108b may be a small, high speed, volatile memory used to store applications and data required often by the processors 102a, 102b. The memories 108a, 108b are commonly implemented with RAM, DRAM, or SDRAM, but in practice may be implemented with any suitable storage medium. The memories 108a, 108b are generally referred to collectively as the system memory.

Another slave device connected to the system bus 104 is a bridge 110. The bridge 110 is used to connect the high speed system bus 104 to a slower, lower-level bus 112. The lower-level bus 112 may be used by the processors 102a, 102b to access peripheral devices (not shown) and additional memories 108c, 108d. These memories 108c, 108d may be large, inexpensive storage mediums used to store applications and data required less often by the processors 102a, 102b, such as hard drives, flash memory, removable disks, or the like. In some architectures, one or both memories may be non-volatile memory, such as ROM, PROM, EPROM, EEPROM memory, CD-ROM, or any other suitable permanent storage medium, The bridge 110, which is a slave device on the system bus 104, is the master device on the lower-level bus 112 for a number of slave devices. The slave devices on the lower-level bus 112 include a memory controller 106c for the memory 108c and a second bridge 114. The second bridge 114 is used to connect the lower-level bus 112 to a second lower-level bus 116 that provides access to memory 108d through memory controller 106d. The second bridge 114 is the master device and the memory controller 106d is the slave device on the second lower-level bus 116.

In the processing system 100 of FIG. 1, the processors 102a, 102b may be configured to execute instructions under control of an operating system and/or other software. The instructions may reside in the various memories 108a-108d. Data may also be stored in the these memory devices 108a-108d and retrieved by the processors 102a, 102b to execute certain instructions. The new data resulting from the execution of these instructions may be written back into these memory devices 108a-108d.

In the embodiment of the processing system 100 shown, any processor 102a, 102b may access the first memory 108a, but only the second processor 102b may the second memory 108b. In addition, each processor 102a, 102b may access the memories 108c, 108d on the lower-level buses 112, 116. A processor may access memory by issuing a "memory access request." A "memory access request" may be a write request, a read request, or any other bus related request. A processor may issue a write request to a target memory by placing the appropriate address, control information and the payload on the transmit channel of the system bus 104. In the case of a read request, a processor may place the address and control information on the transmit channel. In response to the read request, the target memory will send the payload back to the processor on the receive channel of the system bus 104.

A write request issued by a processor will be received by a system bus interconnect 118. The system bus interconnect 118 decodes the address to determine where to route the payload and the control information. In the case of a write request to the memory 108a or 108b (i.e., system memory), the payload, along with the control information is loaded into a buffer (not shown) in the memory controller for the target memory. In the weakly-ordered processing system 100 of FIG. 1, the memory controller may write the contents of its buffer into the target memory out-of-order if performance benefits can be achieved. By way of example, the memory controller may reorder the sequence of memory access requests in the target memory in order to execute all requests to the same page in memory before opening a new page.

Write requests to the memories 108c, 108d on the lower-level buses 112, 116 may be executed in a similar fashion, except that the routing is different. In response to a write request to these memories 108c, 108d, the system bus interconnect 118 routes the payload, along with the control information, to the bridge 110. The bridge 110 transfers the payload and the control information to the lower-level bus 112 for delivery to a lower-level bus interconnect 120. The lower-level bus interconnect 120 manages access to the memories 108c, 108d between the processors 102a, 102b and other bus mastering devices (not shown) within the processing system 100. The payload and the control information are ultimately delivered by the lower-level bus interconnect 120 to one of the memory controllers 106c or 106d. Each memory controller 106c and 106d may also include a buffer (not shown) to allow write operations to performed out-of-order if performance benefits can be achieved.

As indicated earlier, a processor can issue a read request by placing the address and control information on the transmit channel of the system bus 104. The system bus interconnect 118 uses the address to determine where to route the control information. A read request to either memory 108a or 108b (i.e., system memory) causes the system bus interconnect 118 to deliver the control information to the corresponding memory controller where it is loaded into a buffer (not shown). A read request to the other memories 108c, 108d causes the system bus interconnect 118 to deliver the control information to the bridge 110 where it is transferred to the lower-level bus 112. From there, the lower-level bus interconnect 120 delivers the control information to a buffer (not shown) in one of the memory controllers 106c or 106d. The control information may be used by the memory controller for the target memory to deliver a payload back to the processor issuing the read request. To the extent that performance benefits can be achieved, the memory controller for the target memory may execute the memory access requests in its buffer out of sequence.

In some embodiments of the processing system, one or more processors may require that the payloads for the read requests be received in the order that they were issued. This may be the case, for example, where the performance requirements of the processing system are relaxed in order to reduce complexity. Alternatively, a processor may be dynamically switched in and out of a mode that requires payloads to be received in the order they were issued for certain applications. To maintain such flexibility, the protocol may include an "out-of-order read attribute" as part of the control information to be transmitted by the processors with each read request. The out-of-order read attribute may be asserted to indicate that the corresponding read request can be executed in any order. Conversely, the out-of-order read attribute may be deasserted for each of a series of read requests that must be performed in order, either before, after, or interleaved with other pending read requests. A read request with a deasserted out-of-order read attribute will be referred to herein as an "in-order required" read request.

In addition to read and write requests, a processor may issue a memory barrier. The memory barrier is received by the system bus interconnect 118 and routed to each memory in the processing system 100 accessible by the processor issuing the memory barrier, either by way of the transmit channel or by sideband signaling. For example, a memory barrier issued by the first processor 102a will be routed by the system bus interconnect 118 to the first memory 108a in system memory, as well as both memories 108c, 108d on the lower-level buses 112, 116. A memory barrier issued by the second processor 102b, on the other hand, will be routed by the system bus interconnect 118 to every memory 108a-108d shown in the processing system of FIG. 1. Once a processor issues a memory barrier, it will wait until it receives a "memory barrier acknowledgement" before issuing another memory access request. A "memory barrier acknowledgement" is a signal from a slave device indicating that it can enforce an ordering constraint imposed by the memory barrier. In the described embodiment, the memory barrier acknowledgement is sent from the slave device to the issuing processor over the receive channel, however, as those skilled in the art will readily appreciate, the memory barrier acknowledgement can be sent using sideband signaling.

Figure 2:
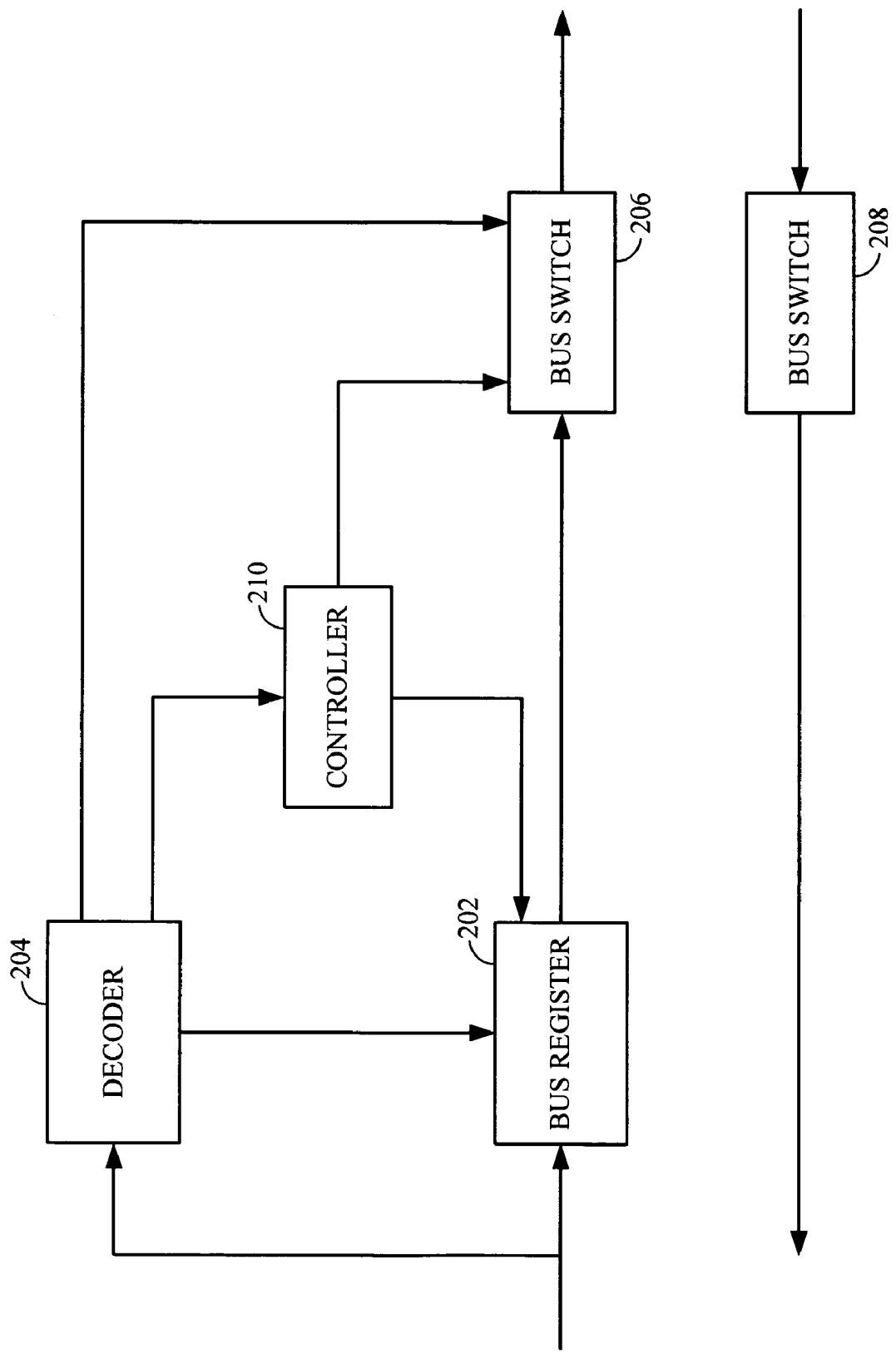
FIG. 2 is a functional block diagram illustrating an example of a system bus interconnect in a weakly-ordered processing system.

FIG. 2 is a functional block diagram illustrating an example of the system bus interconnect 118. The manner in which the system bus interconnect 118 is actually implemented will depend the specific application and the overall design constraints imposed on the processing system. Those skilled in the art will recognize the interchangeability of various designs, and how best to implement the functionality described herein for each particular application.

The system bus interconnect 118 may be used to receive memory access requests from the processors. As discussed earlier, a memory access request for a read or write operation includes the address for the target memory. The memory access request including the address, the control information, and in the case of a write request, the payload is loaded into a bus register 202. The address and control information are also provided to a decoder 204. The decoder 204 is used to determine the target memory for each read and write request in the bus register 202. The decoder 204 output is used to control a transmit bus switch 206. The transmit bus switch 206 is used to direct each memory access request in the bus register 202 to the target slave device. A receive bus switch 208 is used to direct the payloads from the various memories to the processors issuing the read requests.

The control information may also include an out-of-order read attribute which is detectable by the decoder 204. If the out-of-order read attribute is deasserted, the decoder 204 alerts a controller 210. The controller 210 determines whether there are any pending in-order read requests to a memory, other than the target memory, that were issued earlier by the same processor. If so, then the controller 210 delays the release of the read request from the bus register 202 until the payloads from such pending read requests are received by the system bus interconnect 118. If, the controller 210 determines that there are no pending in-order read requests issued earlier by the same processor, or that all pending in-order read requests issued earlier by the same processor are to the target memory, then the read request can be immediately released by the bus register 202 and directed to the target memory through the bus switch 206. In the latter case, the memory controller to the target memory can ensure that all pending in-order read requests are executed in the proper order. In an alternative embodiment, the controller 210 can release all in-order required read requests from the bus register 202 immediately, and control the order that the payloads received from multiple memories are delivered to the processor.

As discussed earlier, a memory access request may also be a bus command, such as a memory barrier. The memory barrier is loaded into the bus register 202 and provided to the decoder 204. The decoder 204 prompts the controller 210 to send the memory barrier in the bus register 202 to each memory accessible by the issuing processor using the bus switch 206. The memories accessible by each processor may be pre-provisioned in the controller 210.

Returning to FIG. 1, a slave device that controls the sequence of all memory access requests to a memory can send a memory barrier acknowledgement to the processor issuing the memory barrier. By way of example, the memory controllers 106a, 106b control the sequence of all memory access requests to their respective memories 108a, 108b. Each of these memory controllers 106a, 106b can be configured to respond to a memory barrier by executing all memory access requests in its buffer when the memory barrier is received before executing any memory access requests received after the memory barrier. If the memory controllers 106a, 106b are configured in this fashion, each can send an acknowledgement back to the system bus interconnect 118 without having to wait for the execution of all outstanding memory access requests in its buffer.

In some embodiments of the processing system, where the receive channel is used to send memory barrier acknowledgements to the processors, the protocol may need to account for the possibility that one or more processors may not be able to process an acknowledgement prior to receiving the payloads for all pending in-order required read requests. One possible solution is to transmit an "out-of-order enable" attribute with the memory barrier. A processor that is not constrained by the order in which a memory barrier acknowledgement is received can assert the out-of-order enable attribute transmitted with the memory barrier. If the out-of-order enable attribute is asserted, then each memory controller 106a, 106b receiving the memory barrier can send an acknowledgement back to the issuing processor as soon as it receives the memory barrier. A processor, on the other hand, that is unable to process a memory barrier acknowledgement prior to receiving the payloads for all in-order required read requests can deassert the out-of-order enable attribute transmitted with the memory barrier. A deasserted out-of-order enable attribute will require each memory controller 106a, 106b receiving the memory barrier to send the payloads for all in-order required read requests issued prior to the memory barrier before sending an acknowledgement back to the issuing processor. Either way, the processor will be able to issue a subsequent memory access request without having to wait for the execution of all prior memory access requests. As a result, the potential for under utilizing the system bus 104 may be reduced, thereby improving performance.

In contrast to the memory controllers 106a, 106b, the bridge 110 between the system bus 104 and the lower-level bus 112 cannot provide an acknowledgement to a memory barrier issued by a processor because it cannot guarantee an ordering constraint imposed by the memory barrier. More specifically, the bridge 110 cannot guarantee that all memory access requests issued before the memory barrier from another bus mastering device (not shown) in the processing system 100 and received by the lower-level bus interconnect 120 will be executed before a memory access request issued by a processor after such processor issues a memory barrier. Consequently, a memory barrier destined for one or both of the memories 108c, 108d cannot be acknowledged by the bridge 110.

The memory controller 106c on the lower-level bus 112 can acknowledge a memory barrier issued by a processor. Much like the memory controllers 106a, 106b in system memory, the memory controller 106c is responsible for controlling the sequence of all memory access requests to the memory 108c. As such, the memory controller 106c can be configured to respond to a memory barrier by executing all memory access requests in its buffer when the memory barrier is received before executing any memory access requests received after the memory barrier. If the memory controller 106c is configured in this fashion, it too can send an acknowledgement back to the issuing processor early. The exact timing of the acknowledgement will depend on the state of the out-of-order enable attribute.

The bridge 114 on the second lower-level bus 116 may also be configured to acknowledge a memory barrier issued by a processor. Unlike the bridge 110 connecting the system bus 104 to the lower-level bus 112, the bridge 114 between the two lower-level buses 112, 116 can be configured to guarantee an ordering constraint imposed by a memory barrier. Thus, an acknowledgement can be sent by the bridge 114 back to the issuing processor early. Again, the timing of the acknowledgement will depend on the state of the out-of-order enable attribute.

Figure 3:
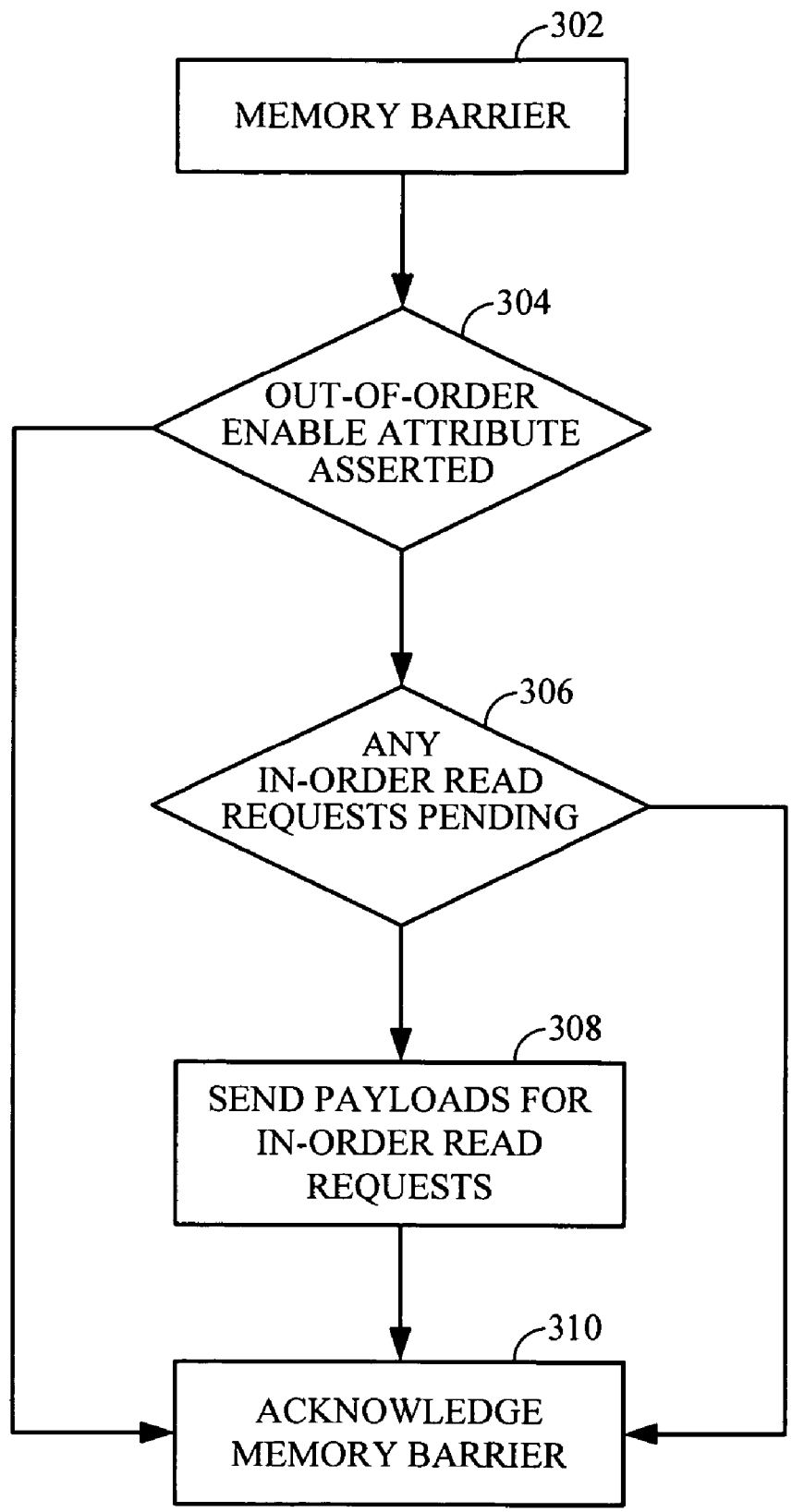
FIG. 3 is a flow chart illustrating an example of the operation of a slave device that can acknowledge a memory barrier early.

FIG. 3 is a flow chart illustrating an example of the operation of a slave device that can acknowledge a memory barrier before all pending memory access requests are executed. In this example, the slave device uses the receive channel to acknowledge memory barriers and is configured to support a protocol that allows one or more processors to issue in-order required read requests. The slave device executes all pending memory access requests in its buffer before the memory barrier, but can acknowledge the memory barrier earlier as illustrated more fully in FIG. 3

In step 302, the slave device receives a memory barrier. The slave device determines, in step 304, whether the out-of-order enable attribute is asserted or deasserted. If the out-of-order enable attribute is asserted, then the slave device can send a memory barrier acknowledgement over the receive channel on the next bus transaction in step 310. If, on the other hand, the out-of-order enable attribute is deasserted, then the slave device determines, in step 306, whether any in-order required read requests are pending in its buffer. The slave device can send the memory barrier acknowledgement over the receive channel on the next bus transaction, in step 310, if there are no pending in-order required read requests. Otherwise, the slave device must first send the payloads for the in-order read requests to the issuing processor in step 308 before acknowledging the memory barrier in step 310.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A weakly-ordered processing system, comprising:
   memory;
   a master device configured to issue memory access requests, including memory barriers and read requests, to the memory; and
   a slave device configured to provide the master device access to the memory, the slave device being further configured to produce a signal indicating that an ordering constraint imposed by a memory barrier issued by the master device will be enforced, the signal being produced before the execution of the read requests issued by the master device to the memory before the memory barrier, wherein each of the read requests includes an out-of-order read attribute, and the memory barrier includes an out-of-order enable attribute, the slave device provides the signal to the master device after sending payloads for the read requests issued prior to the memory barrier that have a deasserted out-of-order read attribute when the out-of-order enable attribute is deasserted.

2. The weakly-ordered processing system of claim 1 wherein the slave is further configured to provide the signal to the master device before the execution of all the memory access requests to the memory issued before the memory barrier.

3. The weakly-ordered processing system of claim 2 further comprising one or more buses connecting the master device to the slave device, the one or more buses having a receive channel, and wherein the slave device is further configured to provide the payloads responsive to the read requests and the signal to the master device on the receive channel.

4. The weakly-ordered processing system of claim 1 further comprising one or more busses, the master device and the slave device being on the same bus.

5. The weakly-ordered processing system of claim 1 further comprising one or more busses, the master device and the slave device being on different busses.

6. The weakly-ordered processing system of claim 1 wherein the slave device comprises a memory controller for the memory.

7. The weakly-ordered processing system of claim 1 wherein the slave device comprises a bridge.

8. A weakly-ordered processing system, comprising:
memory;
a master device configured to issue memory access requests, including memory barriers and read requests, to the memory; and
a slave device configured to provide the master device access to the memory, the slave device being further configured to acknowledge a memory barrier issued by the master device, the memory barrier being acknowledged before the execution of the read requests issued by the master device to the memory before the memory barrier, wherein each of the read requests includes an out-of-order read attribute, and the memory barrier includes an out-of-order enable attribute, the slave device further providing the memory barrier acknowledgement to the master device after sending payloads for the read requests issued prior to the memory barrier that have a deasserted out-of-order read attribute when the out-of-order enable attribute is deasserted.

9. The weakly-ordered processing system of claim 8 wherein the slave is further configured to provide the memory barrier acknowledgement to the master device before the execution of all the memory access requests to the memory issued before the memory barrier.

10. The weakly-ordered processing system of claim 9 further comprising one or more buses connecting the master device to the slave device, the one or more buses having a receive channel, and wherein the slave device is further configured to provide the payloads responsive to the read requests and the memory barrier acknowledgement to the master device on the receive channel.

11. The weakly-ordered processing system of claim 8 wherein the slave device and the memory are coupled together such that all memory access requests to the memory, whether received from the master device or elsewhere, are provided to the slave device.

12. The weakly-ordered processing system of claim 8 further comprising one or more busses, the master device and the slave device being on the same bus.

13. The weakly-ordered processing system of claim 8 further comprising one or more busses, the master device and the slave device being on different busses.

14. The weakly-ordered processing system of claim 8 wherein the slave device comprises a memory controller for the memory.

15. The weakly-ordered processing system of claim 8 wherein the slave device comprises a bridge.

16. A method of executing memory barriers in weakly-ordered processing system having a master device, a slave device, and memory, comprising:
issuing one or more read requests with a deasserted out-of-order read attribute to the memory:
issuing a memory barrier with a deasserted out-of-order enable attribute from the master device to the memory;
producing, at the slave device, a signal indicating that an ordering constraint imposed by the memory barrier will be enforced, the signal being produced before execution of the one or more read requests to the memory issued by the master device before the memory barrier; and
providing payloads for the one or more read requests to the master device before providing the signal to the master device in response to the deasserted out-of-order enable attribute.

17. The method of claim 16 further comprising providing the signal to the master device before the execution of the one or more read requests to the memory issued before the memory barrier.

18. The method of claim 17 wherein the weakly-ordered processing system further comprises one or more buses connecting the master device to the slave device, the one or more buses having a receive channel, and wherein the slave device providing payloads responsive to the one or more read requests and the signal to the master device on the receive channel.

19. The method of claim 16 wherein the weakly-ordered processing system further comprises one or more busses, and wherein the master device issues the memory barrier to the slave device over one of the one or more busses.

20. The method of claim 16 wherein weakly-ordered processing system further comprises one or more busses, and wherein the master device issues the memory barrier on a first one of the buses to the slave device on a second one of the busses.

21. The method of claim 16 wherein the slave device comprises a memory controller for the memory.

22. The method of claim 16 wherein the slave device comprises a bridge.

* * * * *